Jan. 1, 1935.  C. A. SAWTELLE ET AL  1,985,953
BRAKE ASSEMBLY
Filed May 26, 1930   2 Sheets-Sheet 1
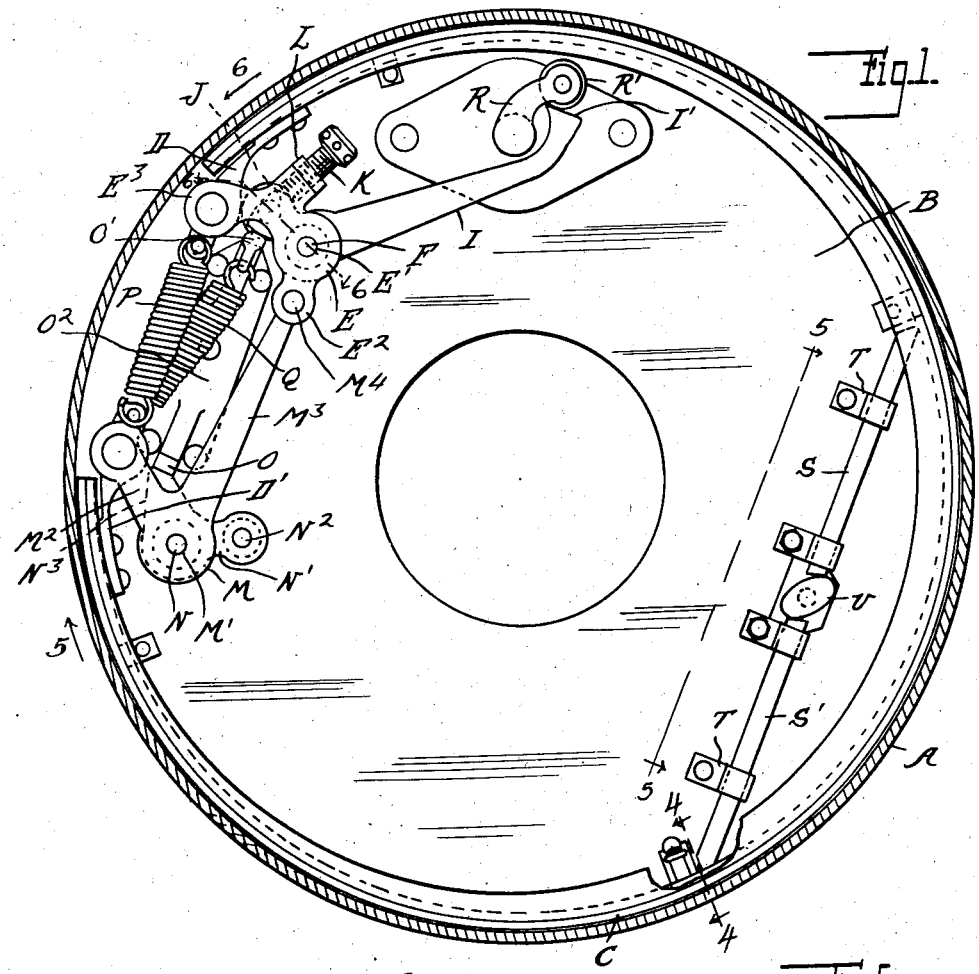
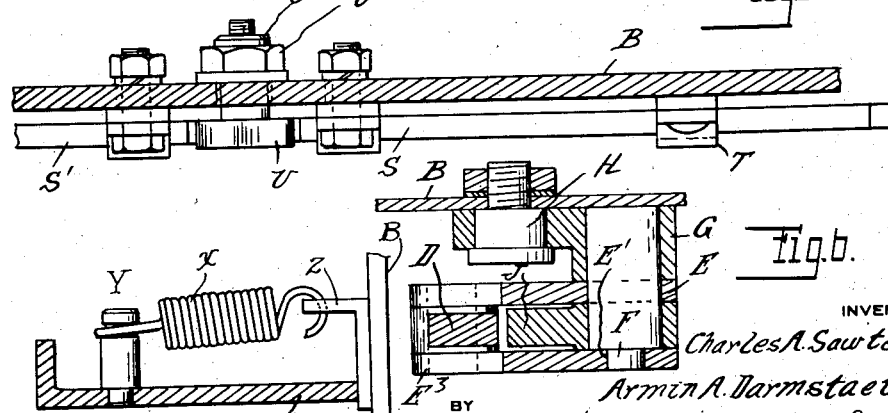
INVENTORS
Charles A. Sawtelle
Armin A. Darmstaetter
BY Whittemore Hulbert Whittemore & Belknap
ATTORNEYS

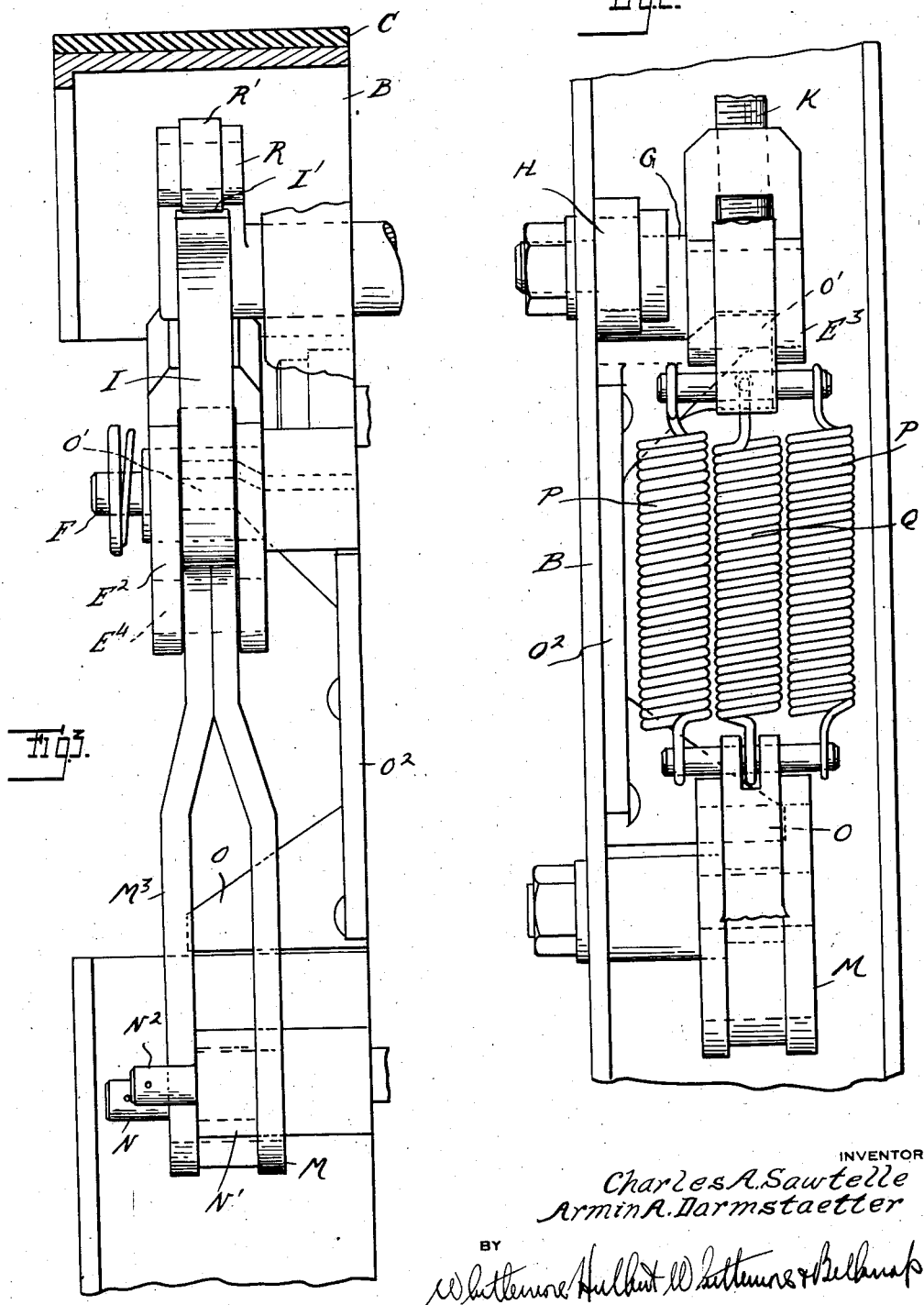

Patented Jan. 1, 1935

1,985,953

UNITED STATES PATENT OFFICE 1,985,953

BRAKE ASSEMBLY

Charles A. Sawtelle and Armin A. Darmstaetter, Detroit, Mich., assignors to S. and D. Engineering Company, Detroit, Mich., a corporation of Michigan Application May 26, 1930, Serial No. 455,872

7 Claims. (Cl. 188—78)

The invention relates to brake mechanisms of that type in which the brake shoe or other brake applying member has a portion of its friction surface which tends to wrap or cling to the co-operating surface of the drum and another portion which tends to unwrap or be repelled from the drum. It is the object of the present invention to provide automatic means for utilizing the wrapping force of the one portion for operating the unwrapping force in the other portion so as to more nearly equalize the braking efficiency of these two portions. It is a further object to so proportion these opposing forces that there will be a preponderance of the wrapping force, thereby making the brake to a certain extent self-energizing. Inasmuch, however, as brakes are used during reverse driving as well as forward driving and as the wrapping and unwrapping portions are reversed in function during such use, it is a further object of the invention to effect an automatic shifting of leverage so as to have a preponderance of the wrapping force in the reverse driving as well as for forward driving. With these and other objects in view the invention consists in the construction as hereinafter set forth.

In the drawings:

Figure 1 is a side elevation of the brake mechanism;

Figure 2 is an end elevation showing the connecting link between the wrapping and unwrapping portions of the brake;

Figure 3 is a cross section showing the operating mechanism in elevation;

Figure 4 is a cross section on line 4—4 of Figure 1;

Figure 5 is a section on line 5—5 of Figure 1; and

Figure 6 is a sectional view on the line 6—6 of Figure 1.

As illustrated, A is a brake drum of any suitable construction and B is the brake head or disk adjacent to said drum. C is an internal brake shoe or band arranged within the drum and extending around the greater portion of the circumference thereof. The free ends of this shoe are connected to each other by a floating linkage through which the shoe may be expanded into frictional contact with the drum and which is of the following construction:

The ends of the shoe have secured thereto the eye brackets D and D'. To the bracket D is secured a bifurcated lever E in the form of a bell crank having a fulcrum portion E' and the arms E² and E³ extending therefrom at substantially right angles. F is a pivot engaging the fulcrum portion E' and secured to a link G which extends radially outward and is pivotally connected at H to the brake head B. In addition to the arms E² and E³, the lever E is provided with an adjustable actuating arm I which is a separate member extending between the furcations of the member E and secured to the pivot F. The member I has a laterally extending bell crank arm J which engages an adjusting screw K threaded in a lug L on the member E, the arrangement being such that the member L when actuated in a radially inward direction will carry with it the member E, both members rotating on the pivot F.

The eye member D' is pivotally connected to a bell crank lever M having a fulcrum portion M' and the arms M² and M³ extending therefrom, the former being attached to the eye D'. The fulcrum portion M' is attached by a pivot N to a link N' which extends radially inward and is pivoted at N² to the head B. The arm M³ of the lever is longer than the arm M² and is also longer than the arm E² of the lever E to which it is pivotally attached at M⁴. Thus in the actuation of the lever arm I in a radially inward direction it will rock the arms E² and M³ radially outward and the arms E² and M² in opposite directions so as to expand the shoe C and press the same into frictional contact with the brake drum.

As thus far described, the linkage between the ends of the shoe C is floating, as the levers E and M are attached to the links H and N, both of which are free to swing. Anchorage is provided through stops O and O' which extend upward from a plate O² secured to the brake head B. The stop O extends into the path of a lug N³ on the link N' which when the brake drum is rotating in the direction of the arrow will prevent the linkage from being carried in the same direction. The stop O' only comes into action during reverse braking and engages the lever E from which it is normally separated. P—P are springs connecting the eye brackets D and D' to retract the brake shoes and Q is another spring attached to the eye bracket D' and to a fixed anchorage upon the head B. The actuating arm I is operated by a rock arm R which as shown has a roller R' at its free end engaging a flat surface I' at the end of the lever I.

The brake shoe C is provided with means for centering the same within the brake drum and normally holding it from out of contact with the braking surface said means being of the following construction:

S and S' are bars extending in alignment with each other and slidably attached to the head B by bearing clips T. The outer ends of these bars extend into proximity to portions of the brake shoe on opposite sides of the center thereof and form stops for limiting the radial inward movement of the shoe at these points. The inner ends of the bars S and S' engage an adjustable cam U clamped in different positions of adjustment by a nut U' engaging a threaded stud $U^2$ which passes through an aperture in the head B. Thus by adjusting this cam the bars S and S' may be moved outward in opposite directions to compensate for any wear in the brake lining.

The reference character X (see Figure 4) indicates a spring attached at one end to a stud Y carried by the brake band and at the other end to a bracket Z carried by the backing plate B. This spring acts to hold the band against displacement with reference to the plate B.

Operation

When the parts are properly adjusted the brake shoe C will be normally held with its braking surface slightly out of contact with the brake drum A and concentric thereto. To set the brake the rock arm R is actuated by suitable pedal connections (not shown) so as to cause the roller R' to press the arm I radially inward. This will turn the bifurcated member E around the fulcrum pivot F, swinging inward the arm $E^2$ and thereby actuating the arm $M^3$ of the member M. The arms $E^2$ and $M^3$ thus operate as a spreading toggle which will separate the ends of the shoe from each other and enlarge the diameter thereof so as to come into friction contact with the inner face of the drum. Assuming that the drum is rotating in the direction of the arrow 5, friction with the surface of the shoe will tend to rotate the latter, and as the toggle linkage is floating, a limited amount of such movement is permitted by the swinging of the links G and N. However, the movement of the link N is arrested by contact with the stop O which prevents further movement of the linkage in the direction of the arrow.

The friction of the drum on the portion of the brake adjacent to the eye bracket D will tend to swing the shoe so as to increase its braking pressure or will cause it to "wrap", as it is technically known. This force without restraint might develop an objectionably high pressure either causing the skidding of the wheels or destructive wear of the lining at this point. On the other hand, the portion of the brake shoe adjacent to the eye bracket D' would be repelled by the friction contact with the drum so as to lose its braking efficiency. Both of these effects are modified by the connecting linkage, as any movement of the lever E by the wrapping force of the adjacent portion of the shoe will cause a corresponding movement of the lever N tending to force a portion of the shoe attached thereto into firmer braking contact with the drum. This in turn will increase the unwrapping force and tend to counteract the wrapping force. If the levers E and N were equal the two forces would neutralize each other but as above stated, it is one of the objects of the invention to produce a self-energizing brake which will assist the manual force actuating the lever I. This desired effect is accomplished by the proportioning of the arms $E^2$ and $M^3$ and the levers E and M which develops a preponderance of pressure by the wrapping portion over the counterpressure by the unwrapping portion.

When the brake drum is rotated in a reverse direction as indicated by the arrow 6, the portion of the shoe which was formerly the wrapping portion will now develop an unwrapping force while the portion which was formerly the unwrapping portion will develop a wrapping force. This would not, however, produce the same braking action in reverse as in the forward rotation of the drum, as the unwrapping force would be in preponderance, thereby not only destroying the self-energizing feature but requiring additional manual pressure to counteract the unwrapping force. Such a result is avoided by changing the leverage of the linkage which is automatically accomplished by the limited rotation of the entire system on the reversal of the drum. As has been stated, the stop O resists rotation of the system when the drum is rotating in a forward direction but will have no effect in resisting a reverse rotation. It has also been stated that the stop O' is during the forward rotation of the drum separated from the lever E. As soon, however, as the direction of the drum is reversed the whole system will rotate until the lever E comes in contact with the stop O' which then operates as an anchorage to prevent further movement. This will change the fulcrum of the lever E from the pin F to the stop O, shortening the arm $E^3$ and lengthening the arm $E^2$. This will change the leverage sufficiently to develop a preponderance of pressure by the wrapping portion of the brake adjacent to the eye bracket D' and will therefore render the brake self-energizing in reverse as well as in forward direction.

What we claim as our invention is:

1. In a brake mechanism including a rotating element and a brake element for engaging the same having a wrapping portion and an unwrapping portion, of a linkage between said wrapping and unwrapping portions for opposing the wrapping force to the unwrapping force and proportioned to give a preponderance of pressure by the wrapping force when the rotating element is rotating in one direction, and means automatically operating upon the rotation of said element in the opposite direction for changing said linkage to obtain a preponderance of pressure by the wrapping force in this direction also.

2. In a brake mechanism, the combination with a rotating drum, of an internal brake element therein having a wrapping portion and an unwrapping portion, a floating linkage between said wrapping and unwrapping portions through which the wrapping force is opposed to the unwrapping force, manually operable means for expanding said linkage to move said element into braking contact with the drum, a stop for limiting movement of said floating linkage and element when the drum is rotating in one direction, a second stop for limiting the floating movement of said linkage and element when the drum is rotated in the reverse direction and means co-operating with said stops for changing the leverage in said linkage when said drum is rotated in reverse directions to secure a preponderance of wrapping force in each direction.

3. In a brake mechanism, the combination with a rotating drum, of an internal brake element therein having a wrapping portion and an unwrapping portion, a linkage between said wrapping and unwrapping portion including toggle levers, manually operable means for actuating said toggle levers to expand said element into braking contact with the drum, co-operating elements in said linkage for opposing the wrapping force to the unwrapping force with a preponderance of pressure in favor of the wrapping force when said drum is rotating in its forward direction, a stop for engaging said linkage to anchor said element when said drum is rotated in its forward direction, a second stop for engaging said linkage to anchor said element when the drum is rotated in reverse direction, said second stop being located to change the leverage of said linkage so as to give a preponderance of the wrapping force in this direction also.

4. In a brake mechanism, the combination with a rotating brake drum and a stationary brake head, of an internal brake element within said drum having a wrapping portion and an unwrapping portion, a floating linkage between said wrapping portion and unwrapping portion through which the force developed by the one is opposed to that developed by the other, said linkage including a pair of bell crank levers respectively pivotally attached to said portions, and having arms of unequal length connected to each other constituting toggle links and also an increase in power leverage between said wrapping portion and unwrapping portion, swinging links mounted on said brake head to which said bell crank levers are fulcrumed, a stop for arresting movement of one of said links when said drum is rotating in forward direction, an arm for actuating one of said bell crank levers to straighten said toggle links and to expand said element into braking contact with said drum, and a second stop for arresting movement of said linkage when said drum is rotating in the reverse direction, said stop being located to form a changed fulcrum for one of said levers for the purpose described.

5. In a brake mechanism, a brake drum, a stationary backing plate, a brake element engaging said drum and having spaced ends, interconnecting linkage for the said ends comprising bell cranks of unequal length having one arm of each bell crank pivotally connected to one another to form levers of fixed length, the other arm of each bell crank being connected respectively to the ends of the brake element, and link members pivotally mounted on said backing plate and respectively pivotally supporting said bell cranks whereby said bell crank pivots shift upon operation of the bell cranks.

6. In a brake mechanism, a rotating member, floating friction means engageable with said member and having a wrapping portion and an unwrapping portion, floating linkage between said wrapping portion and unwrapping portion for opposing the wrapping force to the unwrapping force and proportioned to give a preponderance of pressure by the wrapping force when said member is rotating in one direction.

7. In a brake mechanism, a rotating member, a brake element for engaging said member having a wrapping portion and an unwrapping portion, an anchor for the brake element when said member is rotating in one direction, and floating linkage between said wrapping and unwrapping portions cooperating with the anchor for opposing the wrapping force to the unwrapping force and proportioned to give a preponderance of pressure by the wrapping force.

CHARLES A. SAWTELLE.
ARMIN A. DARMSTAETTER.